(12) United States Patent
Andrews

(10) Patent No.: US 11,135,892 B2
(45) Date of Patent: Oct. 5, 2021

(54) VEHICLE AIR CONDITIONING SYSTEMS AND METHODS EMPLOYING ROTARY ENGINE DRIVEN COMPRESSOR

(71) Applicants: Michael Andrews, Bellingham, WA (US); Tiger Tool International Incorporated, Abbotsford (CA)

(72) Inventor: Michael Andrews, Bellingham, WA (US)

(73) Assignee: TIGER TOOL INTERNATIONAL INCORPORATED, Abbotsford (CA)

( * ) Notice: Subject to any disclaimer, the term of this patent is extended or adjusted under 35 U.S.C. 154(b) by 236 days.

(21) Appl. No.: 15/774,550

(22) PCT Filed: Jan. 27, 2017

(86) PCT No.: PCT/US2017/014941
§ 371 (c)(1),
(2) Date: May 8, 2018

(87) PCT Pub. No.: WO2017/132260
PCT Pub. Date: Aug. 3, 2017

(65) Prior Publication Data
US 2020/0254849 A1  Aug. 13, 2020

Related U.S. Application Data

(60) Provisional application No. 62/286,841, filed on Jan. 25, 2016.

(51) Int. Cl.
*B60H 1/32*  (2006.01)
*B60H 1/00*  (2006.01)
(Continued)

(52) U.S. Cl.
CPC ............. *B60H 1/00* (2013.01); *B60H 1/3222* (2013.01); *B60H 1/3226* (2013.01); *B60K 15/03* (2013.01);
(Continued)

(58) Field of Classification Search
CPC ................ B60H 1/3222; B60H 1/3208; B60H 2001/2284; B60H 2001/3248; B60H 2001/327; B60K 15/03; B60K 25/02
See application file for complete search history.

(56) References Cited

U.S. PATENT DOCUMENTS

D240,428 S  7/1976 Hoffman
4,280,330 A  7/1981 Harris et al.
(Continued)

FOREIGN PATENT DOCUMENTS

CN  103303098 A  *  9/2013  ......... B60H 1/00849
CN  103363603 A  10/2013
(Continued)

OTHER PUBLICATIONS apucenter.com, Auxiliary Power Units—Service—Parts, Comfort Master, https://web.archive.org/web/2014011100715/http://apucenter.com/, Jan. 11, 2014, 2 pages.
(Continued)

*Primary Examiner* — Nelson J Nieves
(74) *Attorney, Agent, or Firm* — Michael R. Schacht; Schacht Law Office, Inc.

(57) ABSTRACT

An air conditioning system comprises a compressor, a rotary engine, and a condenser. The rotary engine comprises at least one drive shaft. The at least one drive shaft is operatively connected to the compressor and to the fuel tank. The condenser is operatively connected to the compressor. The evaporator is operatively connected to the condenser and to the compressor. The rotary engine combusts fuel to rotate
(Continued)

the at least one drive shaft. Rotation of the at least one drive shaft operates the compressor to cause working fluid to flow such that the evaporator air conditions the passenger compartment.

8 Claims, 4 Drawing Sheets

(51) Int. Cl.
  *B60K 15/03* (2006.01)
  *B60K 25/02* (2006.01)
(52) U.S. Cl.
  CPC ........ *B60K 25/02* (2013.01); *B60K 2025/022* (2013.01)

(56) References Cited

U.S. PATENT DOCUMENTS

| | | |
|---|---|---|
| 4,463,576 A | 8/1984 | Burnett et al. |
| 4,531,379 A * | 7/1985 | Diefenthaler, Jr. .. B60H 1/3222 62/236 |
| 4,602,485 A | 7/1986 | Fujimoto et al. |
| D287,264 S | 12/1986 | Rinaldo et al. |
| 4,630,775 A | 12/1986 | Mandon et al. |
| 4,825,663 A | 5/1989 | Nijjar et al. |
| 4,947,657 A | 8/1990 | Kalmbach |
| D322,122 S | 12/1991 | Guetersloh et al. |
| D324,420 S | 3/1992 | Farce |
| D338,952 S | 8/1993 | Snow |
| D393,703 S | 4/1998 | Gilbertson |
| 5,808,441 A | 9/1998 | Nehring |
| 5,896,750 A | 4/1999 | Karl |
| 6,116,513 A | 9/2000 | Perhats |
| 6,158,230 A | 12/2000 | Katsuki |
| D453,560 S | 2/2002 | Van Brunt |
| D456,887 S | 5/2002 | Zlotnik |
| 6,460,356 B1 | 10/2002 | Tao et al. |
| 6,615,602 B2 | 9/2003 | Wilkinson |
| D532,893 S | 11/2006 | Wu |
| D536,078 S | 1/2007 | Leon |
| D536,079 S | 1/2007 | Leon |
| D548,750 S | 8/2007 | Neeley et al. |
| D575,381 S | 8/2008 | Leon |
| 7,430,874 B2 | 10/2008 | Prince et al. |
| 7,448,227 B2 | 11/2008 | Zeigler et al. |
| D630,310 S | 1/2011 | Beland et al. |
| D631,145 S | 1/2011 | Beland et al. |
| D644,320 S | 8/2011 | Virr et al. |
| D647,192 S | 10/2011 | Esteve et al. |
| D648,018 S | 11/2011 | Sordo |
| D663,816 S | 7/2012 | Tebe Poves et al. |
| 8,468,843 B2 | 6/2013 | Futernik et al. |
| D698,431 S | 1/2014 | Garbusi et al. |
| D723,674 S | 3/2015 | Zaari |
| D755,943 S | 5/2016 | Lanssky |
| D762,830 S | 8/2016 | Lewis |
| D763,423 S | 8/2016 | Hewett et al. |
| D766,414 S | 9/2016 | Chu |
| D778,415 S | 2/2017 | Ogg |
| D801,500 S | 10/2017 | Andrews |
| D801,501 S | 10/2017 | Andrews |
| 9,925,847 B2 | 3/2018 | Andrews et al. |
| 2002/0112490 A1 * | 8/2002 | Gong ....................... F25B 45/00 62/149 |
| 2002/0157414 A1 | 10/2002 | Iwanami et al. |
| 2002/0189265 A1 * | 12/2002 | Ferris ....................... C09K 3/12 62/77 |
| 2003/0098148 A1 | 5/2003 | Mehraban et al. |
| 2003/0192952 A1 | 10/2003 | Horn et al. |
| 2003/0217559 A1 | 11/2003 | Ieda et al. |
| 2004/0025525 A1 | 2/2004 | Kubo et al. |
| 2005/0035657 A1 * | 2/2005 | Brummett ............ B60H 1/3226 307/10.1 |
| 2005/0044864 A1 | 3/2005 | Manole et al. |
| 2005/0193754 A1 * | 9/2005 | Chang .................. B60H 1/3222 62/236 |
| 2005/0241818 A1 | 11/2005 | Yakumaru et al. |
| 2006/0288713 A1 | 12/2006 | Knight et al. |
| 2007/0204639 A1 | 9/2007 | Harrison |
| 2009/0211280 A1 | 8/2009 | Alston |
| 2009/0293522 A1 | 12/2009 | Miyazaki |
| 2010/0089563 A1 | 4/2010 | Sundhar et al. |
| 2011/0067422 A1 | 3/2011 | Ichishi et al. |
| 2011/0114405 A1 | 5/2011 | Perhats |
| 2011/0209490 A1 | 9/2011 | Mijanovic et al. |
| 2011/0302942 A1 | 12/2011 | Birchard |
| 2013/0199217 A1 | 8/2013 | Arai et al. |
| 2013/0227973 A1 | 9/2013 | Kang et al. |
| 2014/0007605 A1 | 1/2014 | Schneider et al. |
| 2014/0244107 A1 | 8/2014 | Delevski et al. |
| 2016/0121899 A1 * | 5/2016 | Wankhede ........ B60W 30/1886 701/36 |
| 2016/0288619 A1 | 10/2016 | Andrews |
| 2016/0368373 A1 * | 12/2016 | Dudar ..................... B60K 15/03 |
| 2017/0015175 A1 * | 1/2017 | Pursifull .............. B60H 1/0075 |
| 2017/0015176 A1 * | 1/2017 | Ulrey ...................... F16D 48/00 |
| 2017/0070065 A1 | 3/2017 | Weflen |
| 2017/0158026 A1 * | 6/2017 | Menard ................... F04B 35/06 |
| 2017/0197492 A1 * | 7/2017 | Ishizeki ............... B60H 1/3208 |
| 2018/0215235 A1 | 8/2018 | Andrews et al. |
| 2018/0266742 A1 | 9/2018 | Andrews |

FOREIGN PATENT DOCUMENTS

| | | | |
|---|---|---|---|
| CN | 104713260 A * | 6/2015 | |
| CN | 104919259 A * | 9/2015 | ......... B60H 1/00014 |
| CN | 106414122 A | 2/2017 | |
| DE | 102009048719 A1 * | 4/2011 | ........... B60H 1/3226 |
| EP | 1219478 B1 | 7/2002 | |
| EP | 3277529 A1 | 2/2018 | |
| RU | 2146034 C1 | 2/2000 | |
| RU | 2157037 C1 | 9/2000 | |
| RU | 2425436 C2 | 7/2011 | |
| RU | 2516912 C1 | 5/2014 | |
| SU | 1558311 A3 | 4/1990 | |
| WO | WO-2015065643 A1 * | 5/2015 | ......... B60H 1/00014 |
| WO | WO-2015097457 A1 * | 7/2015 | ........... B60H 1/3222 |
| WO | WO-2016006278 A1 * | 1/2016 | ........... F25B 49/022 |
| WO | 2016161447 | 10/2016 | |
| WO | 2017132260 A1 | 8/2017 | |
| WO | 2017197407 | 11/2017 | |

OTHER PUBLICATIONS

Bergstrom, Bergstrom NITE No-Idle, https://web.archive.org/web/20140207093405/http://us.bergstrominc.com/nite-no-idlel, Feb. 7, 2014, 1 page.

Climacab Crosspoint Solutions, ClimaCab 3.0 APU, Product Overview and Brochure, http://www.crosspointsolutionsgroup.com/climacab/product/climacab-apu.html, 2012, 6 pages.

Cool-It, 12V No-Idle Split A/C System, Product Overview and Brochure, http://cool-it.ca/?s=12+volt+no+idle+system, 2012, 8 pages.

DC AIRCO, High Efficiency Direct Current Air Conditioners, https://web.archive.org/web/20130825041413/http://dcairco.com/index.php/products/trucks, Aug. 25, 2013, 3 pages.

Dometic Group, Dometic Showcases Expanded Line of HVAC Systems for Day Cabs, http://www.2.dometic.com/enus/Americas/USA/Truck-News/Dometic-Showcases-Expanded-Line-of-HVAC-Systems-For-Day-Cabs/, 2010, 1 page.

Hammond Air Conditioning Ltd., Arctic Breeze Truck AC: 12V/DC air conditioning keeps cabs cool without wasting fuel, https://web.archive.org/web/20140108111758/http://www.arcticbreeze-truckac.com/, Jan. 8, 2014, 1 page.

Idle Free Systems, Inc., Systems for all driving conditions, budgets, and investment timelines, http://idlefreesystems.com/no-idle-elimination-systems-battery-reffer-busses.html, 2010-2011, 1 page.

Indel B, Sleeping Well, https://web.archive.org/web/20130530064452/http://www.indelb.com/products/truck_air_conditioning/sleeping_well, May 30, 2013, 2 pages.

(56) References Cited

OTHER PUBLICATIONS

International Searching Authority, ISR & Written Opinion, PCT/US2015019523, dated Jun. 10, 2015, 7 pages.
International Searching Authority, ISR & Written Opinion, PCT/US2016/025923, dated Sep. 8, 2016, 7 pages.
International Searching Authority, ISR & Written Opinion, PCT/US2017/032750, dated Aug. 24, 2017, 7 pages.
International Searching Authority, Written Opinion & ISR, PCT/US2017/014941, dated Apr. 20, 2017, 7 pages.
Rigmaster Power, The Ultimate Stand-Alone Truck Mounted APU, http://rigmasterpower.com, 2011, 1 page.
State Intellectual Property Office of the People's Republic of China, "Notification of the First Office Action", Application No. 201580012907.2, dated Apr. 27, 2018, 8 pages.
Thermo King, APU Tripac Evolution, Product Overview and Brochure, http://www.na.thermoking.com/tk-innovation/global/en/products/apu.html, 2011, 9 pages.
USPTO, "Final Office Action, U.S. Appl. No. 15/047,442,", dated Feb. 14, 2018, 15 pages.
USPTO, "Final Office Action, U.S. Appl. No. 15/090,455,", dated Aug. 30, 2018, 18 pages.
USPTO, "Non-Final Office Action, U.S. Appl. No. 15/047,442,", Aug. 10, 2017, 6 pages.
USPTO, "Non-Final Office Action, U.S. Appl. No. 14/642,601,", dated Jun. 16, 2017, 9 pages.
USPTO, "Non-Final Office Action, U.S. Appl. No. 15/090,455," dated Jan. 18, 2018, 29 pages.
USPTO, "Non-Final Office Action, U.S. Appl. No. 15/936,747," dated Sep. 13, 2018, 13 pages.

\* cited by examiner

VEHICLE AIR CONDITIONING SYSTEMS AND METHODS EMPLOYING ROTARY ENGINE DRIVEN COMPRESSOR

RELATED APPLICATIONS

This application, U.S. patent application Ser. No. 15/774,550 filed May 8, 2018 is a 371 of International PCT Application No. PCT/US2017/014941 filed Jan. 25, 2017.

International PCT Application No. PCT/US2017/014941 claims benefit of U.S. Provisional Application Ser. No. 62/286,841 filed Jan. 25, 2016.

The contents of all related applications are incorporated herein by reference.

TECHNICAL FIELD

The present invention relates to air conditioning systems and methods for vehicles and, in particular, to air conditioning systems and methods for vehicles having a supply of fuel.

BACKGROUND

Air conditioning systems for vehicles typically rely on power generated by the vehicle main engine and/or battery power to operate the compressor of an air conditioning system for the passenger compartment of the vehicle. Use of the vehicle main engine has the benefit of not requiring a separate power source for the air conditioning system but may not be optimized for operation of the air conditioning system, especially when the vehicle main engine is not being used to move the vehicle. Use of a battery to operate the compressor either severely limits the time that the air conditioning system may be used when the vehicle main engine is not running or, to provide extended run times, requires that the vehicle be outfitted with more batteries than are required for normal vehicle functioning.

The need exists for improved air conditioning systems for vehicles that use an existing fuel supply on the vehicle but do not require the use of the vehicle main engine or energy stored in a battery to operate.

SUMMARY

The present invention may be embodied as an air conditioning system for a vehicle comprising a fuel tank, where the vehicle defines a passenger compartment. In this example, the air conditioning system comprises a compressor, a rotary engine, and a condenser. The rotary engine comprises at least one drive shaft. The at least one drive shaft is operatively connected to the compressor and to the fuel tank. The condenser is operatively connected to the compressor. The evaporator is operatively connected to the condenser and to the compressor. The rotary engine combusts fuel to rotate the at least one drive shaft. Rotation of the at least one drive shaft operates the compressor to cause working fluid to flow such that the evaporator air conditions the passenger compartment.

The present invention may also be embodied as a method of air conditioning a vehicle comprising a fuel tank, where the vehicle defines a passenger compartment, the method comprising the following steps. A rotary engine is operatively connected to the fuel tank. At least one drive shaft of the rotary engine is operatively connected to a compressor. A condenser is operatively connected to the compressor. An evaporator is operatively connected to the condenser and to the compressor. The rotary engine is caused to combust fuel to rotate the at least one drive shaft such that rotation of the at least one drive shaft operates the compressor to cause working fluid to flow such that the evaporator air conditions the passenger compartment.

The present invention may also be embodied as an air conditioning system for a vehicle comprising a fuel tank and an alternator, where the vehicle defines a passenger compartment. In this case, the air conditioning system comprises a compressor, a rotary engine, a condenser, and an evaporator. The rotary engine comprises at least one drive shaft. The at least one drive shaft is operatively connected to the compressor and to the alternator. The rotary engine is operatively connected to the fuel tank. A condenser is operatively connected to the compressor. An evaporator is arranged to air condition the passenger compartment of the vehicle, and the evaporator is operatively connected to the condenser and to the compressor. The rotary engine combusts fuel to rotate the first and second drive shafts. Rotation of the at least one drive shaft operates the compressor to cause working fluid to flow such that the evaporator air conditions the passenger compartment. Rotation of the second drive shaft operates the alternator.

DETAILED DESCRIPTION

Figure 1:
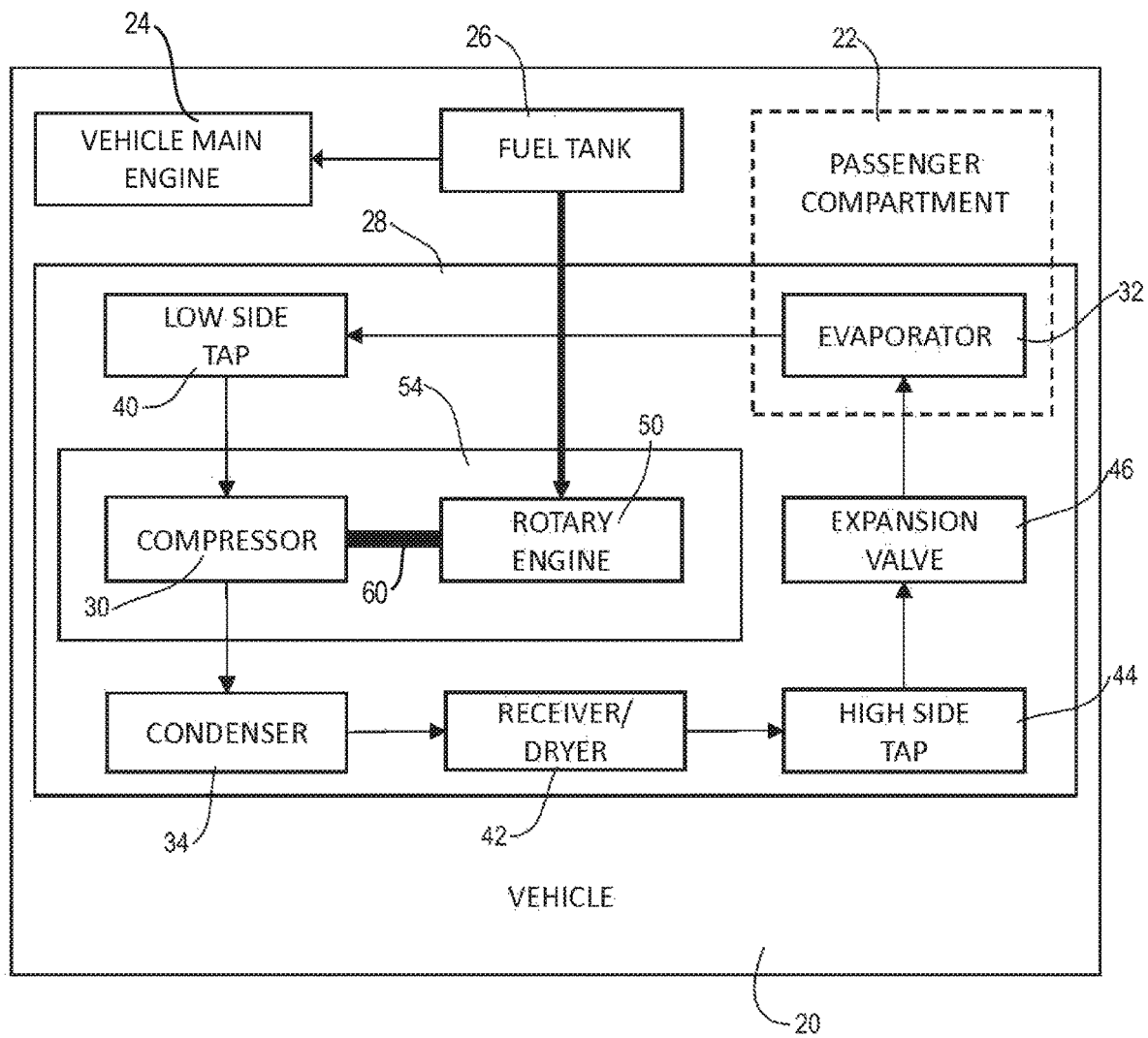
FIG. 1 is a block diagram of a first example vehicle mounted air conditioning system of the present invention.

Referring initially to FIG. 1 of the drawing, depicted therein is a vehicle 20 defining a passenger compartment 22 to be air conditioned. As is conventional, the vehicle 20 comprises a main vehicle engine 24 operatively connected to a fuel tank 26. The main vehicle engine 24 combusts fuel from the fuel tank 26 to displace the vehicle 20.

The present invention is of particular significance when the example main vehicle engine 24 is a diesel engine and the fuel tank 26 stores diesel fuel, and that application of the present invention will be described herein in further. However, the main vehicle engine 24 may use other fuel sources (e.g., gasoline, compressed natural gas, propane) in addition to or instead of diesel fuel. The operation of the vehicle main engine 24 to displace the vehicle 20 otherwise is or may be conventional and will not be described herein in further detail.

The vehicle 20 further supports a first example air conditioning system 28 comprising a compressor 30, an evaporator 32, and a condenser 34. The compressor 30 is operatively connected between an outlet of the evaporator 32 and an inlet of the condenser 34. An outlet of the condenser 34 is operatively connected to an inlet of the evaporator 32. As is conventional, a low side tap 40 is connected between the evaporator 32 and the compressor 30 and a receiver/dryer 42, high side tap 44, and expansion valve 46 are connected between the condenser 34 and the evaporator 32.

Figure 2:
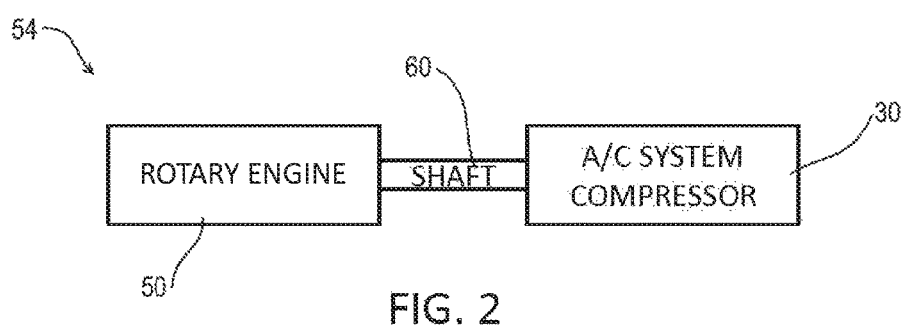
FIG. 2 is a block diagram of a first example compressor sub-system that may be used by the first example vehicle mounted air conditioning system.

The example air conditioning system 28 further comprises a rotary engine 50 operatively connected to the compressor 30. The rotary engine 50 is also operatively connected to the fuel tank 26. The compressor 30 and the rotary engine 50 form a first example compressor sub-system 54 as illustrated in FIGS. 1 and 2. In FIG. 1, thin arrows illustrate flow of working fluid through the air conditioning system 28 and a medium arrow illustrates the flow of fuel from the fuel tank 26 to the rotary engine 50.

The example rotary engine 50 combusts fuel (e.g., diesel fuel) supplied from the fuel tank 26 to cause rotation of a drive shaft 60. The example shown in which the rotary engine 50 combusts the same fuel as the vehicle main engine 24 simplifies storage of fuel on board the vehicle 20. However, the example rotary engine 50 may be configured to combust fuels, such as gasoline, propane, and/or liquid natural gas, in addition to or instead of the example diesel fuel used by the vehicle main engine 24. In some situations, the fuel combusted by the example rotary engine 50 may come from a supply or storage tank other than the fuel tank 26 that supplies fuel to the vehicle main engine 24. For example, the example fuel tank 26 may be configured to supply diesel fuel to the vehicle main engine 24 and a separate fuel tank (e.g., propane tank) may be provided to supply a different fuel (e.g., propane) to the rotary engine 50.

In the example shown in FIG. 1, the drive shaft 60 is mechanically connected to the compressor 30 such that rotation of the drive shaft 60 operates the compressor 30. In the first example air conditioning system 28, the rotary engine 50 operates at a constant RPM associated with optimal operation of the compressor 30.

Figure 3:
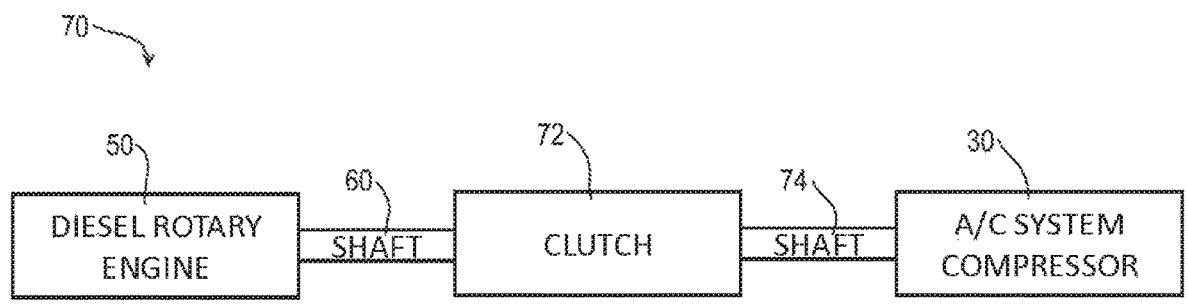
FIG. 3 is a block diagram of a second example compressor sub-system that may be used by the first example vehicle mounted air conditioning system.

FIG. 3 illustrates a second example compressor sub-system 70 comprising the compressor 30, the rotary engine 50, and a clutch 72 connected to a compressor shaft 74. The clutch 72 is operatively connected to the drive shaft 60 of the rotary engine 50 and the compressor shaft 74 is operatively connected to the compressor 30 to allow the compressor 30 to be selectively connected to and disconnected from the drive shaft 60 of the rotary engine 50.

Figure 4:
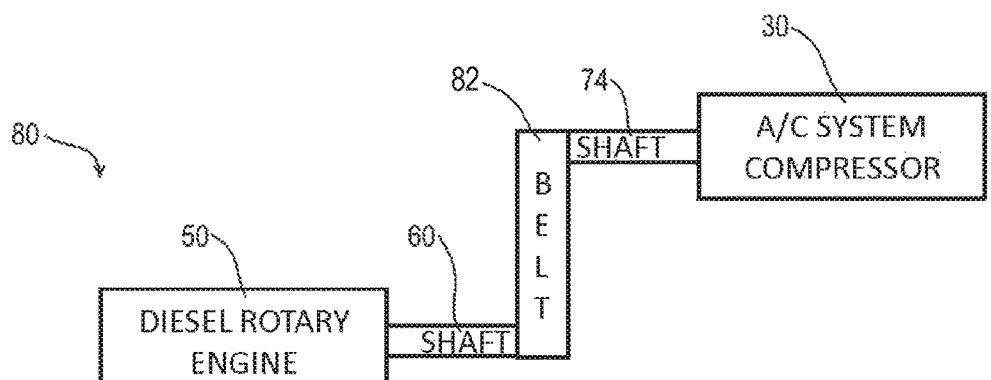
FIG. 4 is a block diagram of a third example compressor sub-system that may be used by the first example vehicle mounted air conditioning system.

FIG. 4 illustrates a third example compressor sub-system 80 comprising the compressor 30, the rotary engine 50, and a belt 82. The belt 82 is operatively connected to the drive shaft 60 of the rotary engine 50 and to a compressor shaft 74 of the compressor 30 to allow rotation of the drive shaft 60 of the rotary engine 50 to be transmitted to the compressor shaft 74 of the compressor 30. As is conventional, wheels may be used to increase or decrease RPM effectively transmitted from the drive shaft 60 to the compressor shaft 74.

Figure 5:
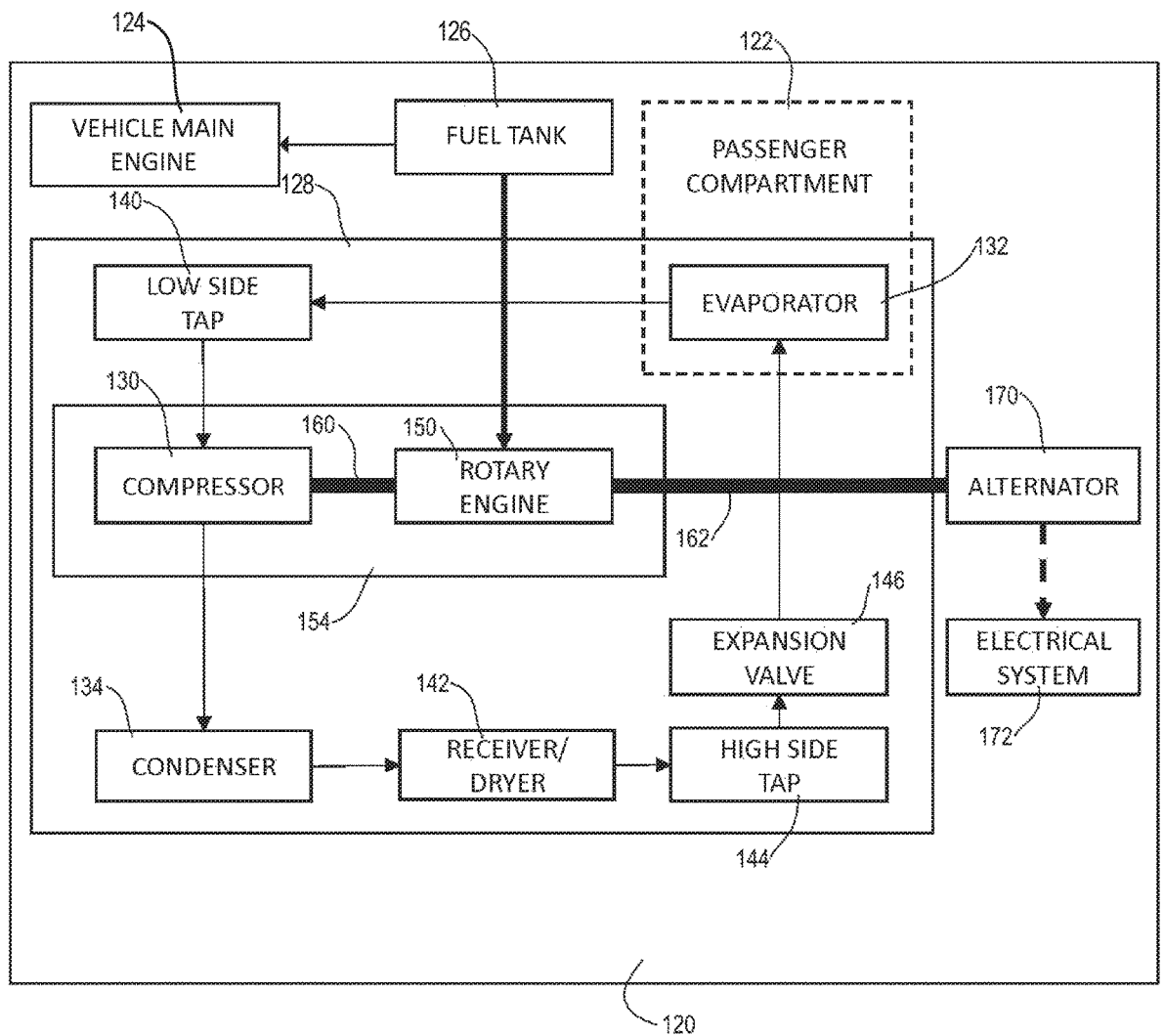
FIG. 5 is a block diagram of a second example vehicle mounted air conditioning system of the present invention.
Figure 6:
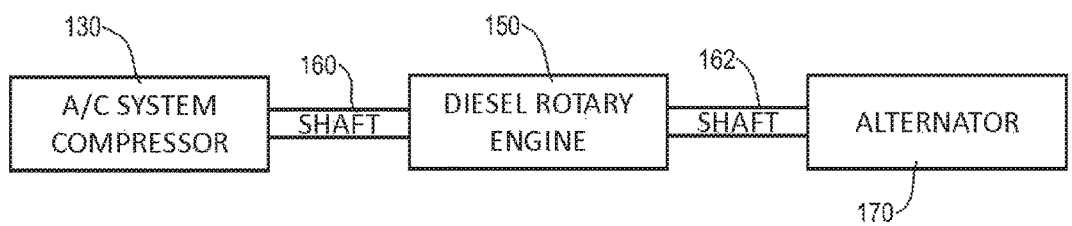
FIG. 6 is a block diagram of a fourth example compressor sub-system that may be used by the second example vehicle mounted air conditioning system.

Referring now to FIGS. 5 and 6 of the drawing, depicted therein is a vehicle 120 defining a passenger compartment 122 to be air conditioned. The main vehicle engine 124 combusts fuel from the fuel tank 126 to displace the vehicle 120. The operation of the vehicle main engine 124 to displace the vehicle 120 is or may be conventional and will not be described herein in further detail.

The vehicle 120 further supports a first example air conditioning system 128 comprising a compressor 130, an evaporator 132, and a condenser 134. The compressor 130 is operatively connected between an outlet of the evaporator 132 and an inlet of the condenser 134. An outlet of the condenser 134 is operatively connected to an inlet of the evaporator 132. As is conventional, a low side tap 140 is connected between the evaporator 132 and the compressor 130 and a receiver/dryer 142, high side tap 144, and expansion valve 146 are connected between the condenser 134 and the evaporator 132. The example air conditioning system 128 further comprises a rotary engine 150 operatively connected to the compressor 130. The rotary engine 150 is also operatively connected to a fuel tank 126. The compressor 130 and the rotary engine 150 form a first example compressor sub-system 154 as illustrated in FIGS. 5 and 6. In FIG. 5, thin arrows illustrate flow of working fluid through the air conditioning system 128 and a medium arrow illustrates the flow of fuel from the fuel tank 126 to the rotary engine 150.

The example rotary engine 150 combusts fuel supplied from the tank 126 to cause rotation of first and second drive shafts 160 and 162. The example shown in which the rotary engine 150 combusts the same fuel as the vehicle main engine 124 simplifies storage of fuel on board the vehicle 120. However, the example rotary engine 150 may be configured to combust fuels, such as gasoline, propane, and/or liquid natural gas, in addition to or instead of diesel fuel. In some situations, the fuel combusted by the example rotary engine 150 may come from a supply or storage tank other than the fuel tank 126 that supplies fuel to the vehicle main engine 124. For example, the example fuel tank 126 may be configured to supply diesel fuel to the vehicle main engine 124 and a separate fuel tank (e.g., propane tank) may be provided to supply a different fuel (e.g., propane) to the rotary engine 150.

The example first drive shaft 160 is mechanically connected to the compressor 130 such that rotation of the first drive shaft 160 operates the compressor 130. The example second drive shaft 162 is mechanically connected to an alternator 170 such that rotation of the second drive shaft 162 operates the alternator 170. The first and second drive shafts 160 and 162 shown in FIGS. 5 and 6 are shown by way of example only, and the rotation of a single drive shaft may be used to operate both the compressor 130 and the alternator 170.

The alternator 170 is in turn electrically connected to an electrical system 172 of the vehicle 120. In FIG. 5, a medium broken arrow illustrates flow of electrical energy from the alternator 170 to the electrical system 172. In the second example air conditioning system 128, the rotary engine 150 operates at a constant RPM associated with optimal operation of the compressor 130 and the alternator 170.

Figure 7:
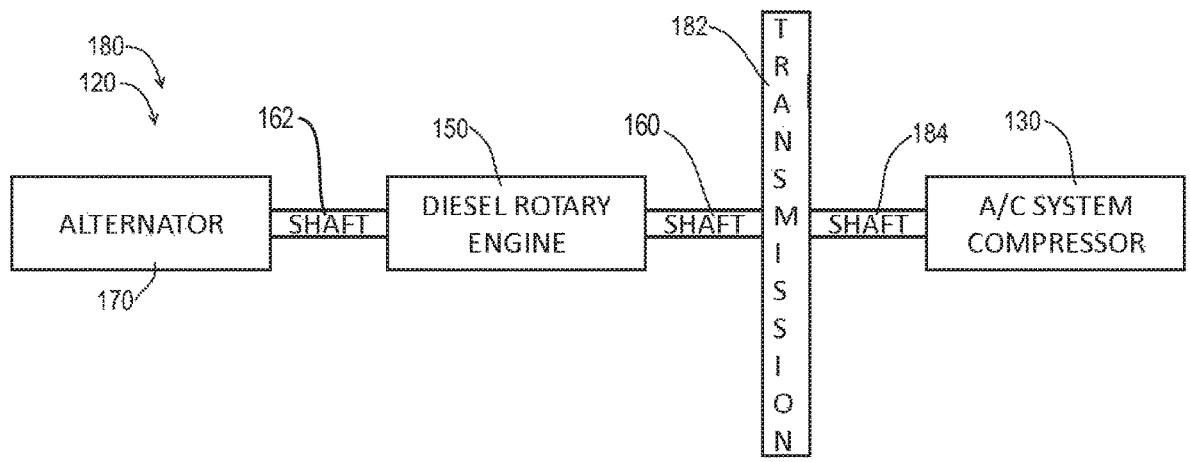
FIG. 7 is a block diagram of a fifth example compressor sub-system that may be used by the second example vehicle mounted air conditioning system.

FIG. 7 illustrates yet another example compressor sub-system 180 that may be used with the example vehicle 120. The example compressor sub-system 180 comprises the compressor 130, the rotary engine 150, and a transmission 182. The transmission 182 may be, for example, a planetary gear that is operatively connected to the second drive shaft 162 of the rotary engine 150 and to a compressor shaft 184 of the compressor 130 to allow rotation of the second drive shaft 162 of the rotary engine 150 to be transmitted to the shaft 184 of the compressor 130. The transmission 182 may be configured to increase or decrease RPM effectively transmitted from the second drive shaft 162 to the compressor shaft 184.

What is claimed is:

1. An air conditioning system for a vehicle comprising a fuel tank containing diesel fuel and a vehicle main engine operatively connected to the fuel tank, where the vehicle defines a passenger compartment and the vehicle main engine operates using the diesel fuel, the air conditioning system comprising:
- a compressor sub-system comprising
  - a compressor;
  - a rotary engine configured to operate on diesel fuel, where the rotary engine
    - comprises at least one drive shaft directly connected to the compressor, and
    - is operatively connected to the fuel tank;
- a condenser operatively connected to the compressor; and
- an evaporator operatively connected to the condenser and to the compressor; wherein
- the rotary engine combusts diesel fuel from the fuel tank to rotate the at least one drive shaft; and
- rotation of the at least one drive shaft operates the compressor to cause working fluid to flow such that the evaporator air conditions the passenger compartment.

2. An air conditioning system as recited in claim 1, in which the vehicle further comprises an alternator, wherein the at least one drive shaft is operatively connected to the alternator.

3. An air conditioning system as recited in claim 1, further comprising:
- a low side tap operatively connected between the evaporator and the compressor; and
- a receiver dryer, high side tap, and expansion valve operatively connected between the condenser and the evaporator.

4. A method of air conditioning a vehicle comprising a fuel tank containing diesel fuel and a vehicle main engine operatively connected to the fuel tank, where the vehicle defines a passenger compartment and the vehicle main engine operates using the diesel fuel, the method comprising the steps of:
- providing a rotary engine comprising at least one drive shaft, where the rotary engine is configured to operate on diesel fuel;
- providing a compressor;
- forming a compressor sub-system by directly connecting the at least one drive shaft of the rotary engine to the compressor;
- operatively connecting a condenser to the compressor;
- operatively connecting an evaporator to the condenser and to the compressor;
- operatively connecting the rotary engine to the fuel tank to combust diesel fuel from the fuel tank to rotate the at least one drive shaft;
- operating the rotary engine such that rotation of the at least one drive shaft operates the compressor to cause working fluid to flow such that the evaporator air conditions the passenger compartment.

5. A method as recited in claim 4, further comprising the steps of operatively connecting the at least one drive shaft of the rotary engine to an alternator.

6. A method as recited in claim 4, further comprising the steps of:
- operatively connecting a low side tap between the evaporator and the compressor; and
- operatively connecting a receiver dryer, high side tap, and expansion valve between the condenser and the evaporator.

7. An air conditioning system for a vehicle comprising a fuel tank containing diesel fuel, an alternator, and a vehicle main engine operatively connected to the fuel tank, where the vehicle defines a passenger compartment and the vehicle main engine operates using the diesel fuel, the air conditioning system comprising:
- a compressor sub-system comprising
  - a compressor;
  - a rotary engine configured to operate on diesel fuel, where the rotary engine
    - comprises at least one drive shaft, where
      - the at least one drive shaft is operatively and directly connected to the compressor,
      - the at least one drive shaft is operatively connected to the alternator; and
    - is operatively connected to the fuel tank;
- a condenser operatively connected to the compressor; and
- an evaporator arranged to air condition the passenger compartment of the vehicle, where the evaporator is operatively connected to the condenser and to the compressor; wherein
- the rotary engine combusts diesel fuel from the fuel tank to rotate the first and second drive shafts;
- rotation of the at least one drive shaft operates the compressor to cause working fluid to flow such that the evaporator air conditions the passenger compartment; and
- rotation of the at least one drive shaft of the rotary engine operates the alternator.

8. An air conditioning system as recited in claim 7, further comprising:
- a low side tap operatively connected between the evaporator and the compressor; and
- a receiver dryer, high side tap, and expansion valve operatively connected between the condenser and the evaporator.

* * * * *